United States Patent
Khurana

(10) Patent No.: US 12,452,649 B2
(45) Date of Patent: Oct. 21, 2025

(54) ENABLING AN EFFICIENT TRANSITION OF MULTIPLE MOBILE DEVICES FROM ONE WIRELESS TELECOMMUNICATION NETWORK TO ANOTHER

(71) Applicant: T-Mobile USA, Inc., Bellevue, WA (US)

(72) Inventor: Rahul Kumar Khurana, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 463 days.

(21) Appl. No.: 18/160,891

(22) Filed: Jan. 27, 2023

(65) Prior Publication Data

US 2024/0259788 A1 Aug. 1, 2024

(51) Int. Cl.
*H04W 8/18* (2009.01)
*H04W 8/24* (2009.01)
*H04W 12/02* (2009.01)

(52) U.S. Cl.
CPC .............. *H04W 8/24* (2013.01); *H04W 12/02* (2013.01)

(58) Field of Classification Search
None
See application file for complete search history.

(56) References Cited

U.S. PATENT DOCUMENTS

| | | |
|---|---|---|
| 6,879,677 B2 | 4/2005 | Trandal et al. |
| 7,353,016 B2 | 4/2008 | Roundtree et al. |
| 7,489,947 B2 | 2/2009 | Castrogiovanni et al. |
| 8,073,440 B2 | 12/2011 | Quimby et al. |
| 8,165,572 B1 | 4/2012 | Kirchhoff et al. |
| 8,295,812 B1 | 10/2012 | Jones |
| 8,306,518 B1 | 11/2012 | Gailloux et al. |
| 8,311,532 B2 | 11/2012 | Waller |
| 8,326,274 B2 | 12/2012 | Lee et al. |
| 8,346,227 B2 | 1/2013 | Quimby et al. |
| 8,364,154 B1 | 1/2013 | Raghunath et al. |
| 8,401,533 B1 | 3/2013 | Kirchhoff et al. |
| 8,452,247 B2 | 5/2013 | Hong et al. |
| 8,464,315 B2 | 6/2013 | Ahtisaari |
| 8,483,663 B1 | 7/2013 | Jones |

(Continued)

FOREIGN PATENT DOCUMENTS

| | | |
|---|---|---|
| DE | 102012022701 A1 | 5/2014 |
| EP | 1631106 A2 | 3/2006 |

(Continued)

*Primary Examiner* — Gary Lafontant
(74) *Attorney, Agent, or Firm* — Perkins Coie LLP

(57) ABSTRACT

The disclosed system receives, from a first UE operating on the second network, a request to enable the first UE and a second UE to operate on the first network. The request includes an address associated with the second UE and a second phone number of the second UE. The system obtains a first unique identifier of the first UE and generates a second message including an invitation uniquely associated with the second phone number. The system sends the second message to the address associated with the second UE. Upon receiving the selection of the invitation, the system obtains from the second UE a second unique identifier of the second UE. Based on the first unique identifier and the second unique identifier, the system enables the first UE and the second UE to operate on the first network.

20 Claims, 6 Drawing Sheets

(56) References Cited

U.S. PATENT DOCUMENTS

| | | |
|---|---|---|
| 8,594,622 B2 | 11/2013 | Jerath et al. |
| 8,682,305 B1 | 3/2014 | Kirchhoff et al. |
| 8,942,688 B2 | 1/2015 | Kirchhoff et al. |
| 9,384,479 B2 | 7/2016 | Larkin |
| 9,467,573 B2 | 10/2016 | Jerath et al. |
| 9,572,036 B2 | 2/2017 | Meredith et al. |
| 9,801,035 B2 | 10/2017 | Hodges et al. |
| 9,826,087 B2 | 11/2017 | Seward et al. |
| 9,942,757 B2 | 4/2018 | Brand et al. |
| 9,942,770 B2 | 4/2018 | Meredith et al. |
| 11,082,831 B2 * | 8/2021 | Shah .................. H04W 76/11 |
| 11,184,479 B2 | 11/2021 | Singh et al. |
| 11,432,115 B2 | 8/2022 | Merrett |
| 11,445,357 B1 | 9/2022 | Arends et al. |
| 2004/0192339 A1 | 9/2004 | Wilson et al. |
| 2004/0229601 A1 | 11/2004 | Zabawskyj et al. |
| 2005/0143097 A1 | 6/2005 | Wilson et al. |
| 2007/0129103 A1 | 6/2007 | Al-Shaikh |
| 2008/0261558 A1 | 10/2008 | Enriquez |
| 2010/0026816 A1 | 2/2010 | Bergstrom et al. |
| 2010/0029326 A1 | 2/2010 | Temple et al. |
| 2010/0093396 A1 | 4/2010 | Roundtree |
| 2010/0273513 A1 | 10/2010 | Hsu |
| 2011/0117894 A1 | 5/2011 | Roundtree et al. |
| 2012/0028620 A1 | 2/2012 | Roundtree et al. |
| 2012/0209729 A1 | 8/2012 | Lovegreen |
| 2012/0245985 A1 | 9/2012 | Cho et al. |
| 2012/0275442 A1 | 11/2012 | Malets et al. |
| 2013/0122862 A1 | 5/2013 | Horn et al. |

FOREIGN PATENT DOCUMENTS

| | | |
|---|---|---|
| EP | 2073466 A1 | 6/2009 |
| EP | 2503496 A1 | 9/2012 |
| EP | 2509349 A1 | 10/2012 |
| EP | 2582115 B1 | 12/2015 |
| EP | 2826004 B1 | 9/2020 |
| JP | 2000516061 A | 11/2000 |
| JP | 2004518356 A | 6/2004 |
| JP | 2005530430 A | 10/2005 |
| JP | 2008086046 A | 4/2008 |
| JP | 2009506589 A | 2/2009 |
| JP | 5525496 B2 | 4/2014 |
| JP | 5693575 B2 | 2/2015 |
| JP | 5813056 B2 | 10/2015 |
| KR | 100849878 B1 | 8/2008 |
| KR | 100904824 B1 | 6/2009 |
| KR | 100997623 B1 | 12/2010 |
| KR | 20120017052 A | 2/2012 |
| KR | 101113864 B1 | 3/2012 |
| KR | 20150144813 A | 12/2015 |
| KR | 102384891 B1 | 4/2022 |
| KR | 102466240 B1 | 11/2022 |
| WO | 9940731 A2 | 8/1999 |
| WO | 0174097 A1 | 10/2001 |
| WO | 03039121 A1 | 5/2003 |
| WO | 2004077369 A1 | 9/2004 |
| WO | 2005081852 A2 | 9/2005 |
| WO | 2005125163 A1 | 12/2005 |
| WO | 2005125230 A1 | 12/2005 |
| WO | 2006122588 A1 | 11/2006 |
| WO | 2009092105 A2 | 7/2009 |
| WO | 2010017038 A2 | 2/2010 |
| WO | 2010129122 A2 | 11/2010 |
| WO | 2012148314 A1 | 11/2012 |
| WO | 2013057606 A2 | 4/2013 |
| WO | 2013062703 A1 | 5/2013 |
| WO | 2013072786 A2 | 5/2013 |
| WO | 2013135898 A1 | 9/2013 |
| WO | 2014159862 A1 | 10/2014 |
| WO | 2017172813 A1 | 10/2017 |
| WO | 2020127553 A1 | 6/2020 |
| WO | 2021002268 A1 | 1/2021 |

* cited by examiner

ENABLING AN EFFICIENT TRANSITION OF MULTIPLE MOBILE DEVICES FROM ONE WIRELESS TELECOMMUNICATION NETWORK TO ANOTHER

BACKGROUND

Switching wireless service providers can be an arduous process, especially if there are multiple devices associated with the same plan. The person requesting the change of the wireless service providers needs to provide detailed information about each of the devices on the same plan. That detailed information can be hard to gather. In addition, the person may need to wait for each step in the transfer to be completed before the next step begins. Overall, the whole transfer process can take multiple hours to complete.

Figure 1:
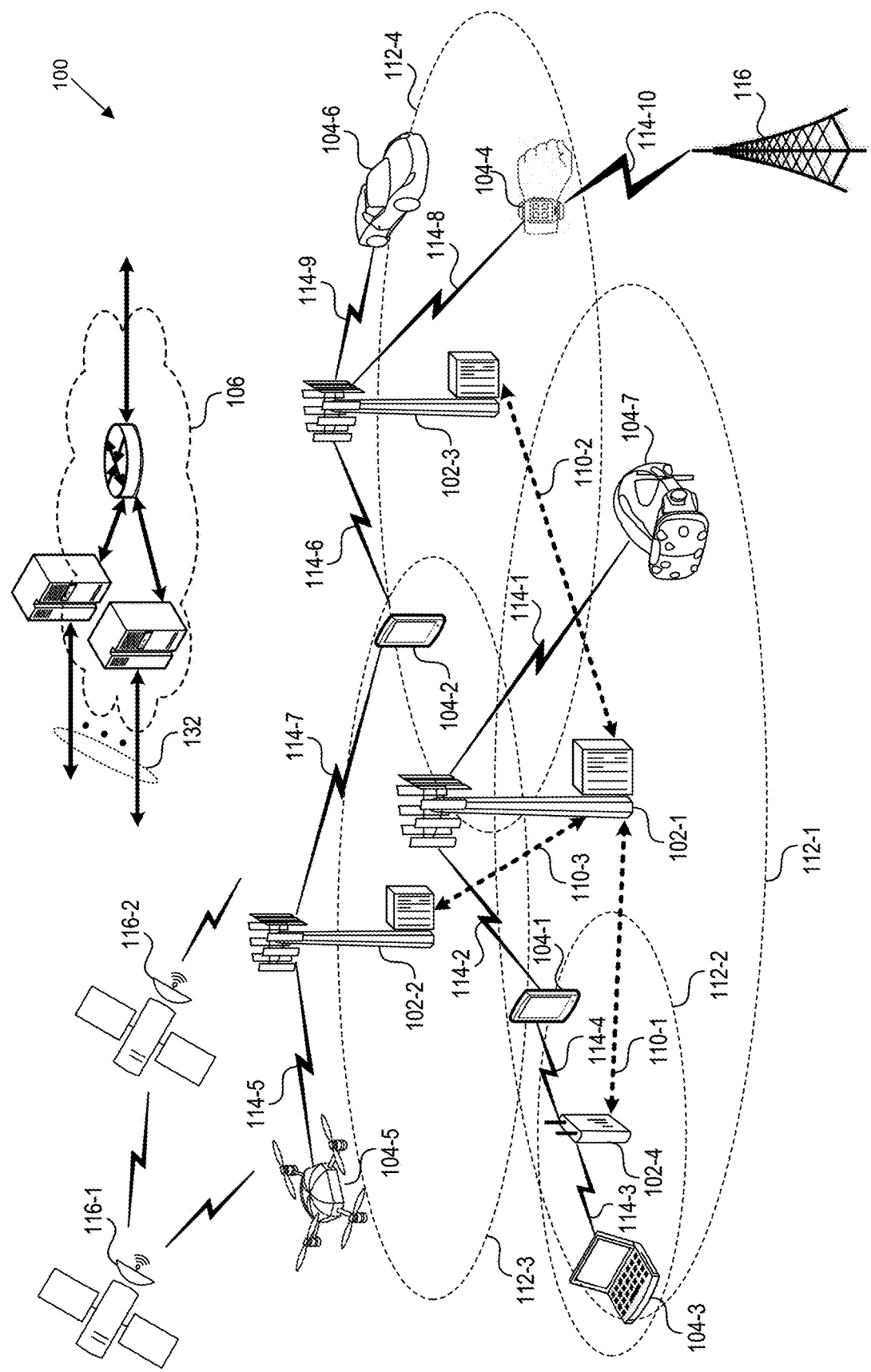
FIG. 1 is a block diagram that illustrates a wireless telecommunication network ("network") in which aspects of the disclosed technology are incorporated.

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Presented here is a system to enable an efficient transition of multiple mobile devices from a wireless telecommunication network B to a wireless telecommunication network A. The system receives a request from a mobile device A among the multiple mobile devices operating on the wireless telecommunication network B to enable the mobile device A and a mobile device B to operate on the wireless telecommunication network A. The mobile device A includes an electronic subscriber identity module (eSIM) A number, and the mobile device B includes an eSIM B number. The request includes an address associated with the mobile device B, such as an email of a user of the mobile device B, and a phone number B of the mobile device B. Mobile device A can use an application running on the mobile device A to send the request, or can send the request via a website.

The system obtains an International Mobile Equipment Identity (IMEI) A associated with the mobile device A and the eSIM A number. The system generates a message including a uniform resource locator (URL) link uniquely associated with the phone number B. The system sends the message to the address associated with the mobile device B. Upon receiving the selection of the URL link, the system obtains from the mobile device B an IMEI B of the mobile device B and the eSIM B number. Based on the IMEI A, the eSIM A number, the IMEI B, and the eSIM B number, the system enables the mobile device A and the mobile device B to operate on the wireless telecommunication network A.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
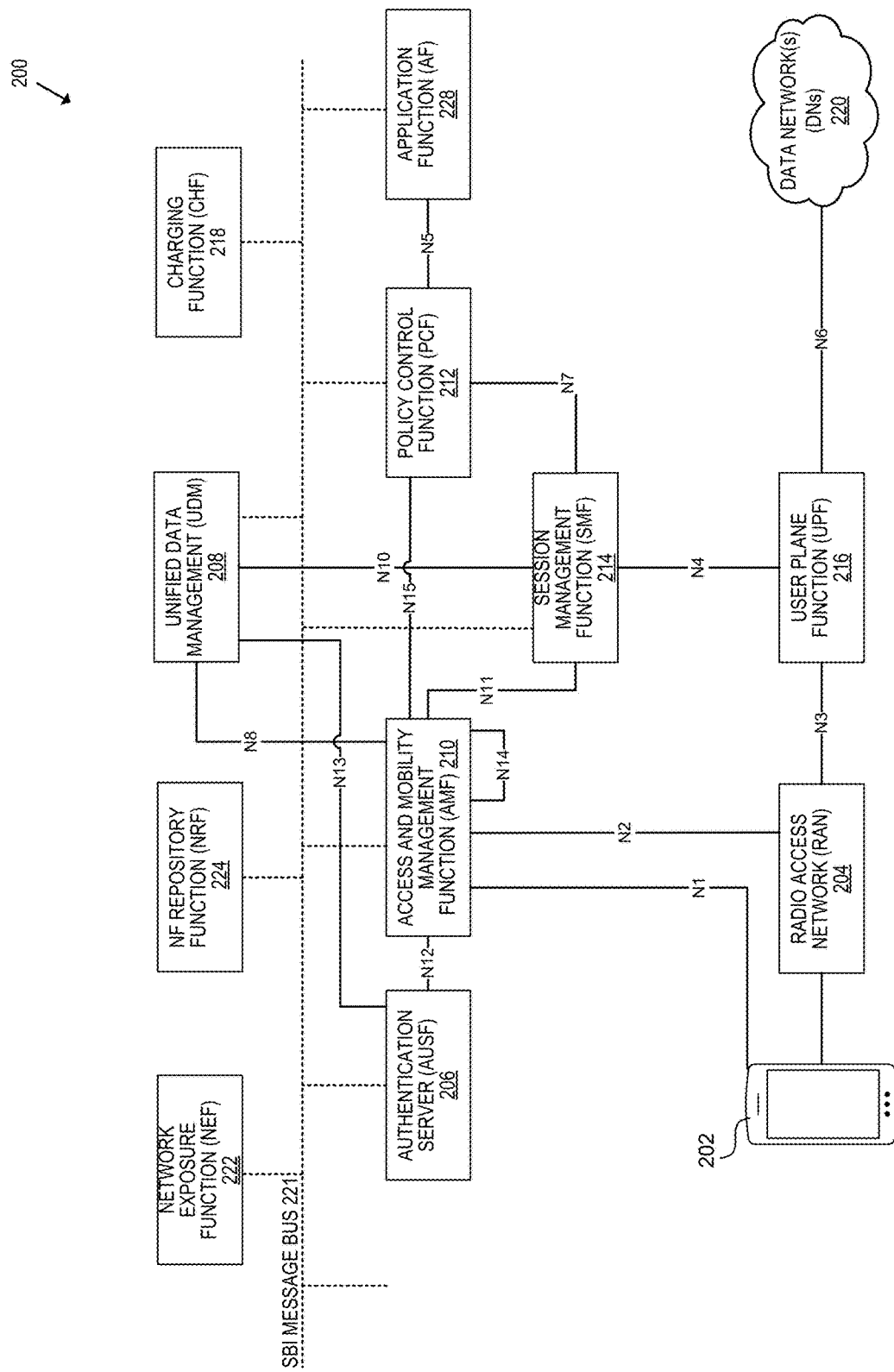
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214, assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes Network Slice selection, which is regulated by the NSSF 226.

Figure 3:
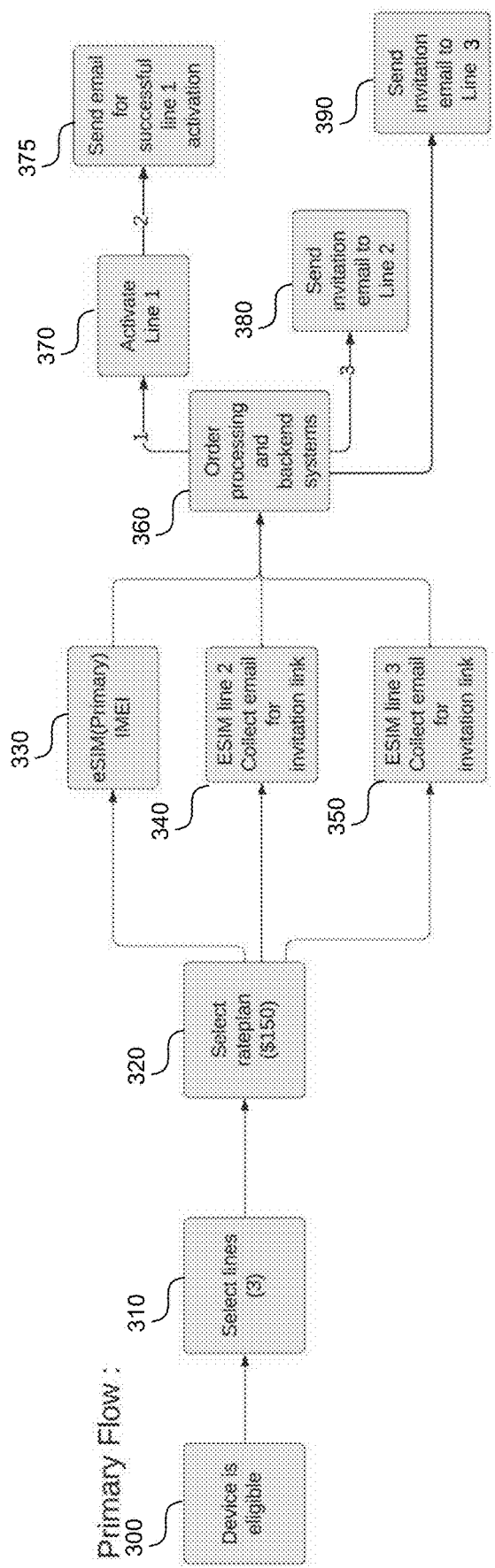
FIG. 3 shows the steps to transition a primary user equipment (UE) from one network to another.

Enabling an Efficient Transition of Multiple Mobile Devices from One to Another Wireless Telecommunication Network FIG. 3 shows the steps to transition a primary UE from one network to another. The primary UE, in this case a wireless device 104 as shown in FIG. 1, can operate on one wireless telecommunication network, such as the AT&T network, and can send a request to another network 100 in FIG. 1, such as the T-Mobile network, to transition the primary UE to the network 100. Upon receiving the request, the network 100, in step 300, can determine whether the UE is eligible to be transferred.

To determine whether the primary UE 104 is eligible, the network 100 can determine the technical capabilities of the primary UE and determine whether the technical capabilities of the primary UE are compatible with the network 100. For example, if the primary UE 104 is a 4G UE, but the network 100 is a 5G network, the network can indicate to the primary UE that the primary UE is not eligible to be transferred.

Upon determining that the primary UE 104 is eligible to be transferred, in step 310, the network 100 can ask the primary UE 104 to select additional UEs, e.g., secondary UEs, to transfer to the network 100. The primary UE 104 can indicate one or more additional UEs to transfer to the network, such as two additional UEs as shown in FIG. 3.

In step 320, the primary UE 104 can select a plan to provide to all the UEs. Each of the UEs can include an electronic subscriber identity module (eSIM) number. In step 330, the primary UE 104 can provide the eSIM number and an International Mobile Equipment Identity (IMEI) associated with the primary UE. In step 340, the primary UE 104 can provide an address and/or a phone number of the second UE. Similarly, in step 350, the primary UE 104 can provide an address and/or a phone number of the third UE. The address can be nongeographic and unique to the user of the second UE, such as an email, or the address can be a phone number associated with the second UE.

In step 360, the network 100 can process the received information. In step 370, the network 100 can enable the primary UE 104 to operate by activating the first line. To determine the phone number associated with the primary UE 104 on the network 100, the network can ask the primary UE whether the user associated with the primary UE wants to keep the same phone number, or obtain a different phone number. If the user wants to keep the same phone number, the network 100 can transfer the same phone number from the previous network. If the user wants to obtain a different phone number, the network 100 can generate a new phone number and activate it. Similarly, the network 100 can ask the primary UE 104 whether the secondary UEs want to keep their respective phone numbers, or whether new numbers on the network 100 should be generated. The primary UE 104 can indicate to keep the phone numbers, generate new phone numbers, and/or keep the phone number for some of the secondary UEs and generate new phone numbers for the other secondary UEs. In step 375, the network 100 can send a message, such as an email, to the primary, e.g., first UE 104 to indicate successful addition of the primary UE 104 to the network 100.

In steps 380, 390, the network 100 can send a message to the second and the third UE, respectively, including an invitation to transfer to the network 100. The invitation can include a uniform resource locator (URL) link to a website or an application that can help with the transfer.

Figure 4:
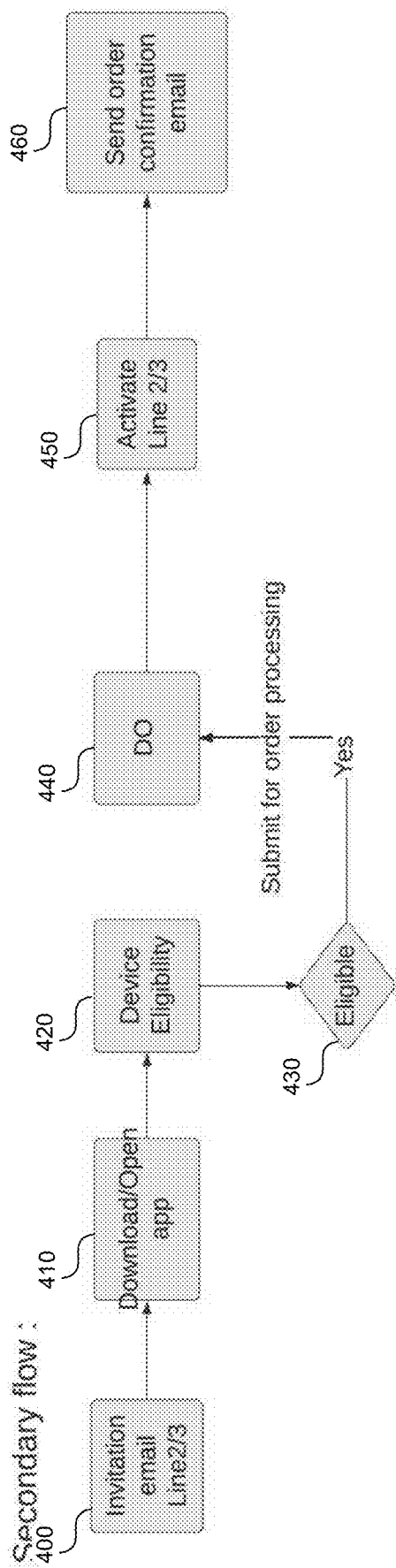
FIG. 4 shows the steps the secondary UE can perform to join the network.

FIG. 4 shows the steps the secondary UE can perform to join the network 100 in FIG. 1. In step 400, the secondary UE can receive the message, such as an email, including the invitation to join the network 100 in FIG. 1. The invitation can include a URL link. In step 410, the user of the secondary UE can access the website or download an application enabling the secondary UE to transfer to the network 100.

In step 420, the network 100 can determine the secondary UE eligibility, such as the technical specifications of the secondary UE. In step 430, the network 100 can determine whether the UE is eligible to join the network 100. In step 440, upon determining that the UE is eligible to join, the network 100 can generate a request to create another line. In step 450, the network 100 can activate the line associated with the secondary UE. The phone number associated with the secondary UE can be specified by the primary UE 104 in FIG. 3. In step 460, the network 100 can send a message, such as an email, to the primary UE 104 and/or the secondary UE to indicate successful addition of the secondary UE to the network 100.

Figure 5:
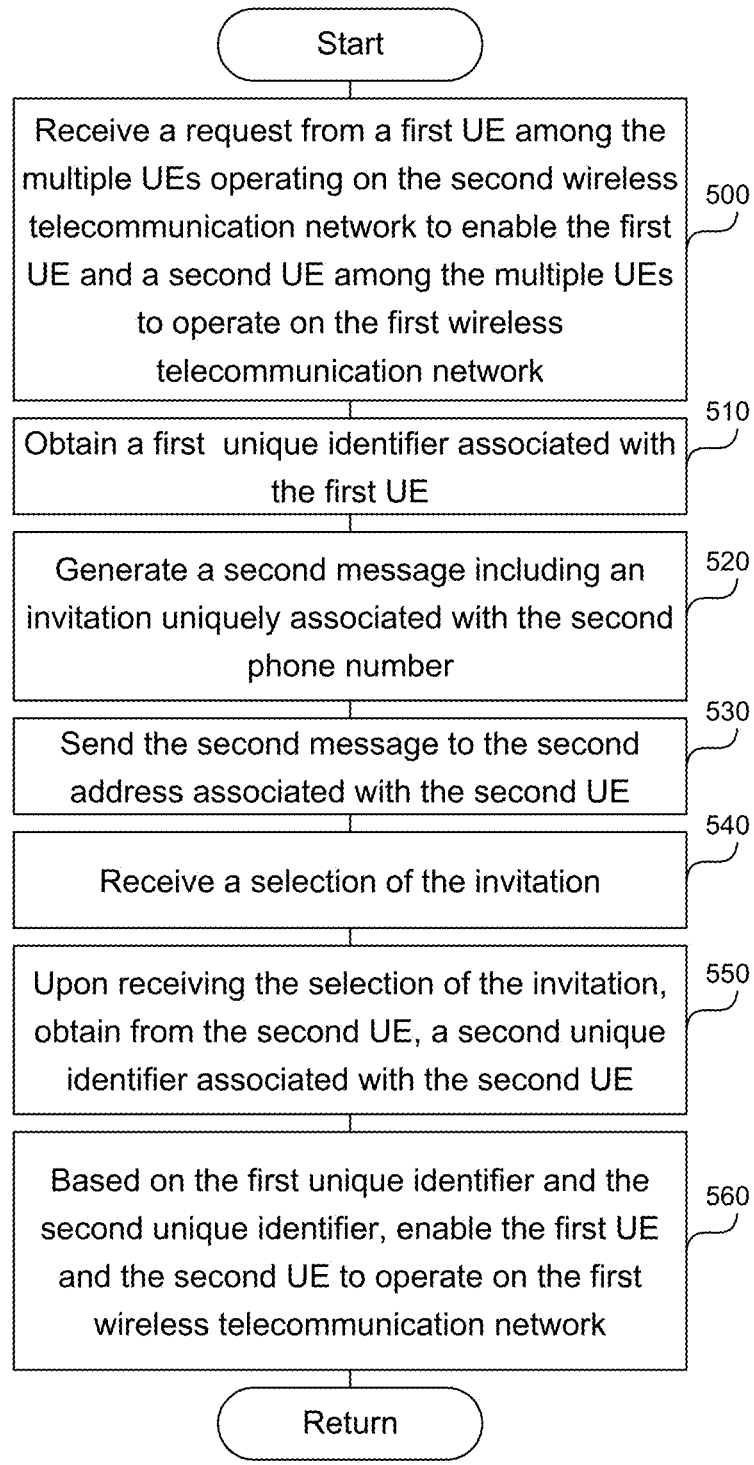
FIG. 5 is a flowchart of a method to enable an efficient transition of multiple mobile devices from a second wireless telecommunication network to a first wireless telecommunication network.

FIG. 5 is a flowchart of a method to enable an efficient transition of multiple mobile devices from a second wireless telecommunication network to a first wireless telecommunication network. In step 500, a hardware or software processor executing instructions described in this application can receive a request from a first UE, e.g., the primary UE, among the multiple UEs operating on the second wireless telecommunication network to enable the first UE and a second UE among the multiple UEs to operate on the first wireless telecommunication network. The request can include an address associated with the second UE and a second phone number associated with the second UE. The first UE can install a specialized application to generate and send the request. The address can be an email address, or a phone number of the second UE. The first UE and the second UE can include a first eSIM number and a second eSIM number, respectively.

In step 510, the processor can obtain a first unique identifier associated with the first UE. The first unique identifier can include a first IMEI associated with the first UE and a first eSIM number.

In step 520, the processor can generate a second message including an invitation uniquely associated with the second phone number. The invitation can be a URL link.

In step 530, the processor can send the second message to the address associated with the second UE. For example, the processor can send an email to the second UE.

In step 540, the processor can receive a selection of the invitation. For example, the processor can receive a selection of the URL link.

In step 550, upon receiving the selection of the invitation, the processor can obtain from the second UE a second unique identifier associated with the second UE. The second unique identifier can include a second IMEI associated with the second UE and the second eSIM number.

In step 560, based on the first unique identifier and the second unique identifier, the processor can enable the first UE and the second UE to transition to, e.g. operate on, the first wireless telecommunication network. The first UE in the second UE may no longer to be authorized on the second wireless telecommunications network.

The processor can obtain payment information during the transfer of the first UE. The processor can request from the first UE payment information associated with the first UE. The processor can use the payment information associated with the first UE to enable both the first UE and the second UE to operate on the first wireless telecommunication network.

The processor can ask a first user of the first UE whether to keep or change the number of the first UE. The processor can obtain a first phone number associated with the first UE. The processor can query the first UE whether to preserve the first phone number on the first wireless telecommunication network or change the first phone number. Upon receiving an indication to preserve the first phone number on the first wireless telecommunication network, the processor can enable the first UE to operate on the first wireless telecommunication network using the first phone number. Upon receiving an indication to change the first phone number, the processor can generate a phone number different from the first phone number. The processor can enable the first UE to operate on the first wireless telecommunication network using the generated phone number.

The processor can ask the first user whether to keep or change the number of the second UE. The processor can query the first UE whether to preserve the second phone number on the first wireless telecommunication network or change the second phone number. Upon receiving an indication to preserve the second phone number on the first wireless telecommunication network, the processor can enable the second UE to operate on the first wireless telecommunication network using the second phone number. Upon receiving an indication to change the second phone number, the processor can generate a phone number different from the second phone number. The processor can enable the second UE to operate on the first wireless telecommunication network using the generated phone number.

If there are multiple additional UEs, such as a second and a third UE, the first UE can indicate to keep the phone number of one of the additional UEs, and generate a new phone number for the other additional UE. The processor can receive the request from a first UE among the multiple UEs operating on the second wireless telecommunication network to enable the first UE, a second UE among the multiple UEs, and a third UE among the multiple UEs to operate on the first wireless telecommunication network. The processor can query the first UE whether to preserve the second phone number on the first wireless telecommunication network or change the second phone number. The processor can query the first UE whether to preserve a third phone number associated with the third UE on the first wireless telecommunication network or change the third phone number. The processor can receive a second indication to preserve the second phone number, and a third indication to change the third phone number. Upon receiving the third indication to change the third phone number, the processor can generate a phone number different from the third phone number. Based on the second indication, the processor can enable the second UE to operate on the first wireless telecommunication network using the second phone number. Based on the third indication, the processor can enable the third UE to operate on the first wireless telecommunication network using the generated phone number.

Before transferring the first UE and the secondary UEs to the network 100 in FIG. 1, the processor can perform a security check and verify that the first UE requesting the transfer is authorized to make the request. Upon receiving the request from the first UE, the processor can obtain a first phone number associated with the first UE, and a secret identifier associated with the first phone number. The processor can verify whether the secret identifier is associated with the first UE. The secret identifier can be a personal identification number (PIN) associated with the first UE. The processor can verify with the second wireless network that the PIN and the UE are associated with each other. Upon verifying that the secret identifier is not associated with the first UE, the processor can send a first message to the first UE indicating that the transition of the multiple UEs from the second wireless telecommunication network to the first wireless telecommunication network cannot proceed. Upon verifying that the secret identifier is associated with the first UE, the processor can proceed with transferring the first UE to the network 100.

Computer System

Figure 6:
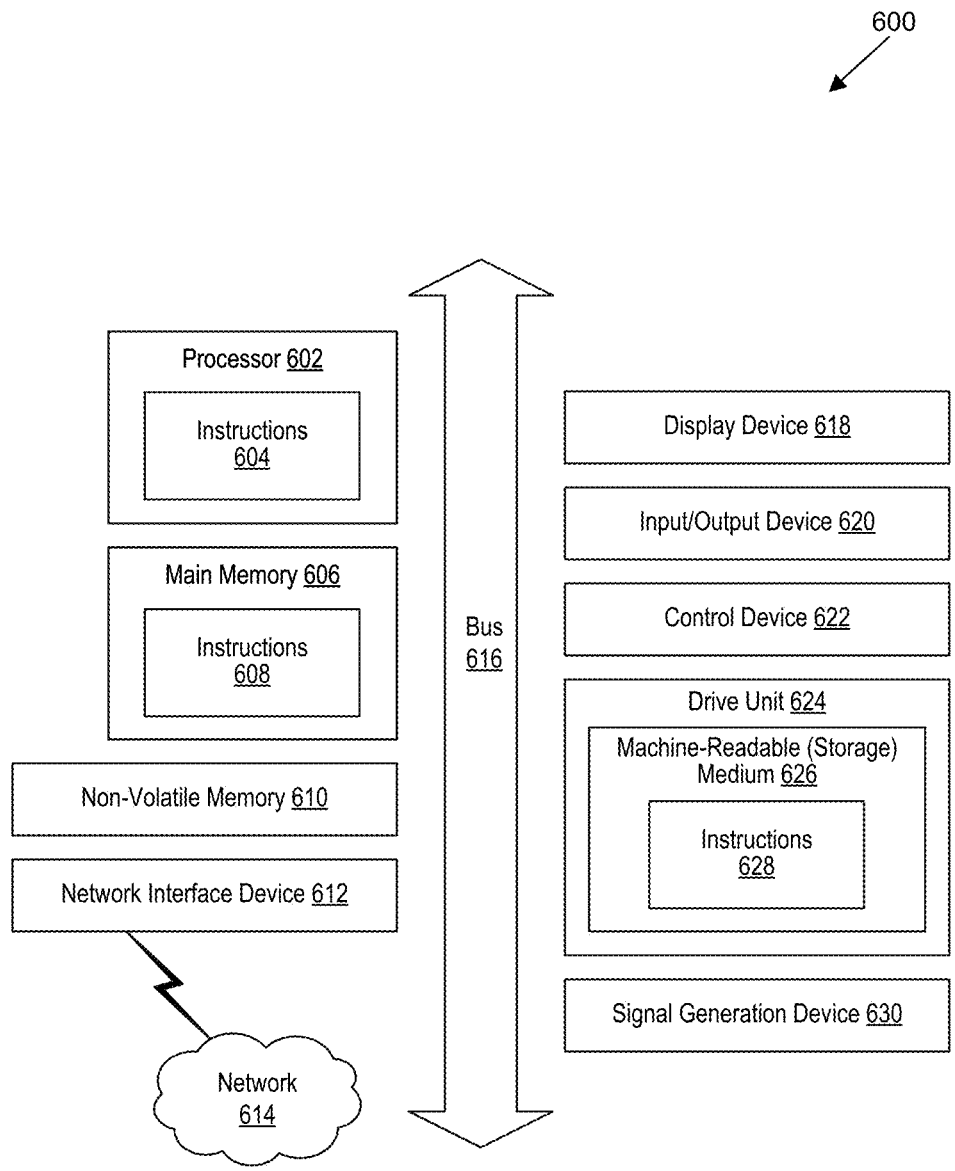
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system, such as a mesh of computer systems, or can include one or more cloud components in one or more networks. Where appropriate, one or more computer systems 600 can perform operations in real time, in near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. At least one non-transitory computer-readable storage medium storing instructions to enable an efficient transition of multiple mobile devices from a second wireless telecommunication network to a first wireless telecommunication network, which, when executed by at least one data processor of a system, cause the system to:
receive a request from a first mobile device among the multiple mobile devices operating on the second wireless telecommunication network to enable the first mobile device and a second mobile device to operate on the first wireless telecommunication network, wherein the first mobile device includes a first electronic subscriber identity module (eSIM) number and the second mobile device includes a second, different eSIM number, and
wherein the request includes an address associated with the second mobile device and a second phone number associated with the second mobile device;
obtain a first International Mobile Equipment Identity (IMEI) associated with the first mobile device and the first eSIM number;
generate a message including a uniform resource locator (URL) link uniquely associated with the second phone number;
send the message to the address associated with the second mobile device;
receive a selection message associated with selection of the URL link;
upon receiving the selection message, obtain from the second mobile device a second IMEI associated with the second mobile device and the second eSIM number; and
based on the first IMEI, the first eSIM number, the second IMEI, and the second eSIM number, enable the first mobile device and the second mobile device to be authorized to operate on the first wireless telecommunication network and no longer to be authorized on the second wireless telecommunications network.

2. The at least one non-transitory computer-readable storage medium of claim 1, comprising instructions to:
receive the request from the first mobile device among the multiple mobile devices operating on the second wireless telecommunication network to enable the first mobile device, the second mobile device among the multiple mobile devices, and a third mobile device among the multiple mobile devices to operate on the first wireless telecommunication network;
query the first mobile device whether to preserve the second phone number on the first wireless telecommunication network or change the second phone number;
query the first mobile device whether to preserve a third phone number associated with the third mobile device on the first wireless telecommunication network or change the third phone number;
receive a second indication indicating to preserve the second phone number, and a third indication indicating to change the third phone number;
upon receiving the third indication to change the third phone number, generate a phone number different from the third phone number;
based on the second indication, enable the second mobile device to operate on the first wireless telecommunication network using the second phone number; and
based on the third indication, enable the third mobile device to operate on the first wireless telecommunication network using the generated phone number.

3. The at least one non-transitory computer-readable storage medium of claim 1, comprising instructions to:
request from the first mobile device payment information associated with the first mobile device; and
use the payment information associated with the first mobile device to enable both the first mobile device and the second mobile device to operate on the first wireless telecommunication network.

4. The at least one non-transitory computer-readable storage medium of claim 1, comprising instructions to:
obtain a first phone number associated with the first mobile device;
query the first mobile device whether to preserve the first phone number on the first wireless telecommunication network or change the first phone number;
upon receiving an indication to preserve the first phone number on the first wireless telecommunication network, enable the first mobile device to operate on the first wireless telecommunication network using the first phone number;
upon receiving an indication to change the first phone number, generate a phone number different from the first phone number; and
enable the first mobile device to operate on the first wireless telecommunication network using the generated phone number.

5. The at least one non-transitory computer-readable storage medium of claim 1, comprising instructions to:
query the first mobile device whether to preserve the second phone number on the first wireless telecommunication network or change the second phone number;
upon receiving an indication to preserve the second phone number on the first wireless telecommunication network, enable the second mobile device to operate on the first wireless telecommunication network using the second phone number;
upon receiving an indication to change the second phone number, generate a phone number different from the second phone number; and
enable the second mobile device to operate on the first wireless telecommunication network using the generated phone number.

6. The at least one non-transitory computer-readable storage medium of claim 1, comprising instructions to:
upon receiving the request from the first mobile device, obtain a first phone number associated with the first mobile device, and a secret identifier associated with the first phone number;
verify whether the secret identifier is associated with the first mobile device; and
upon verifying that the secret identifier is not associated with the first mobile device, send another message to the first mobile device indicating that the transition of the multiple mobile devices from the second wireless telecommunication network to the first wireless telecommunication network cannot proceed.

7. A system comprising:
at least one hardware processor; and
at least one non-transitory memory storing instructions, which, when executed by the at least one hardware processor, cause the system to:
receive a request from a first UE among multiple UEs operating on a second wireless telecommunication network to enable the first UE and a second UE to operate on a first wireless telecommunication network,
wherein the request includes an address associated with the second UE and a second phone number associated with the second UE;
obtain a first unique identifier associated with the first UE;
generate a message including an invitation uniquely associated with the second phone number;
send the message to the address associated with the second UE;
receive a selection based on the invitation;
upon receiving the selection based on the invitation, obtain from the second UE a second unique identifier associated with the second UE; and based on the first unique identifier and the second unique identifier, enable the first UE and the second UE to transition to the first wireless telecommunication network.

8. The system of claim 7, comprising instructions to:
request from the first UE payment information associated with the first UE; and
use the payment information associated with the first UE to enable both the first UE and the second UE to operate on the first wireless telecommunication network.

9. The system of claim 7, comprising instructions to:
obtain a first phone number associated with the first UE;
query the first UE whether to preserve the first phone number on the first wireless telecommunication network or change the first phone number;
upon receiving an indication to preserve the first phone number on the first wireless telecommunication network, enable the first UE to operate on the first wireless telecommunication network using the first phone number;
upon receiving an indication to change the first phone number, generate a phone number different from the first phone number; and
enable the first UE to operate on the first wireless telecommunication network using the generated phone number.

10. The system of claim 7, comprising instructions to:
query the first UE whether to preserve the second phone number on the first wireless telecommunication network or change the second phone number;
upon receiving an indication to preserve the second phone number on the first wireless telecommunication network, enable the second UE to operate on the first wireless telecommunication network using the second phone number;
upon receiving an indication to change the second phone number, generate a phone number different from the second phone number; and
enable the second UE to operate on the first wireless telecommunication network using the generated phone number.

11. The system of claim 7, comprising instructions to:
receive the request from a first UE among the multiple UEs operating on the second wireless telecommunication network to enable the first UE, a second UE among the multiple UEs, and a third UE among the multiple UEs to operate on the first wireless telecommunication network;
query the first UE whether to preserve the second phone number on the first wireless telecommunication network or change the second phone number;
query the first UE whether to preserve a third phone number associated with the third UE on the first wireless telecommunication network or change the third phone number;
receive a second indication indicating to preserve the second phone number, and a third indication indicating to change the third phone number;
upon receiving the third indication to change the third phone number, generate a phone number different from the third phone number;
based on the second indication, enable the second UE to operate on the first wireless telecommunication network using the second phone number; and
based on the third indication, enable the third UE to operate on the first wireless telecommunication network using the generated phone number.

12. The system of claim 7, comprising instructions to:
upon receiving the request from the first UE, obtain a first phone number associated with the first UE, and a secret identifier associated with the first phone number;
verify whether the secret identifier is associated with the first UE; and
upon verifying that the secret identifier is not associated with the first UE, send a another message to the first UE indicating that a transition of the multiple UEs from the second wireless telecommunication network to the first wireless telecommunication network cannot proceed.

13. The system of claim 7, wherein the first unique identifier includes a first IMEI associated with the first UE and a first eSIM number, and wherein the second unique identifier includes a second IMEI associated with the second UE and a second eSIM number.

14. A system comprising:
at least one hardware processor; and
at least one non-transitory memory storing instructions, which, when executed by the at least one hardware processor, cause the system to:
generate, by a first UE among multiple UEs operating on a second wireless telecommunication network, a request to enable the first UE and a second UE to operate on a first wireless telecommunication network,
wherein the request includes an address associated with the second UE and a second phone number associated with the second UE;
send the request to the first wireless telecommunication network;
provide a first unique identifier associated with the first UE to the first wireless telecommunication network;
cause the first wireless telecommunication network to generate a message including an invitation uniquely associated with the second phone number;
cause the first wireless telecommunication network to send the message to the address associated with the second UE;
cause the first wireless telecommunication network to receive a selection of the invitation;
upon receiving the selection of the invitation, cause the first wireless telecommunication network to obtain from the second UE a second unique identifier associated with the second UE; and
based on the first unique identifier and the second unique identifier, cause the first wireless telecommunication network to enable the first UE and the second UE to operate on the first wireless telecommunication network.

15. The system of claim 14, comprising instructions to:
provide payment information associated with the first UE; and
cause the first wireless telecommunication network to use the payment information associated with the first UE to enable both the first UE and the second UE to operate on the first wireless telecommunication network.

16. The system of claim 14, comprising instructions to:
provide a first phone number associated with the first UE;
receive a query whether to preserve the first phone number on the first wireless telecommunication network or change the first phone number;
send an indication to preserve the first phone number on the first wireless telecommunication network;

cause the first wireless telecommunication network to enable the first UE to operate on the first wireless telecommunication network using the first phone number;

send an indication to generate a phone number different from the first phone number; and cause the first wireless telecommunication network to enable the first UE to operate on the first wireless telecommunication network using the generated phone number.

17. The system of claim 14, comprising instructions to:

receive a query at the first UE whether to preserve the second phone number on the first wireless telecommunication network or change the second phone number;

send an indication to preserve the second phone number on the first wireless telecommunication network;

cause the first wireless telecommunication network to enable the second UE to operate on the first wireless telecommunication network using the second phone number;

send an indication to change the second phone number;

cause the first wireless telecommunication network to generate a phone number different from the second phone number; and cause the first wireless telecommunication network to enable the second UE to operate on the first wireless telecommunication network using the generated phone number.

18. The system of claim 14, comprising instructions to:

generate the request from a first UE among the multiple UEs operating on the second wireless telecommunication network to enable the first UE, a second UE among the multiple UEs, and a third UE among the multiple UEs to operate on the first wireless telecommunication network;

send the request to the first wireless telecommunication network;

receive a query at the first UE whether to preserve the second phone number on the first wireless telecommunication network or change the second phone number;

receive a query at the first UE whether to preserve a third phone number associated with the third UE on the first wireless telecommunication network or change the third phone number;

send a second indication indicating to preserve the second phone number, and a third indication indicating to change the third phone number;

upon sending the third indication to change the third phone number, cause the first wireless telecommunication network to generate a phone number different from the third phone number;

based on the second indication, cause the first wireless telecommunication network to enable the second UE to operate on the first wireless telecommunication network using the second phone number; and based on the third indication, cause the first wireless telecommunication network to enable the third UE to operate on the first wireless telecommunication network using the generated phone number.

19. The system of claim 14, comprising instructions to:

provide a first phone number associated with the first UE, and a secret identifier associated with the first phone number;

cause the first wireless telecommunication network to verify whether the secret identifier is associated with the first UE; and upon verifying that the secret identifier is not associated with the first UE, cause the first wireless telecommunication network to send another message to the first UE indicating that a transition of the multiple UEs from the second wireless telecommunication network to the first wireless telecommunication network cannot proceed.

20. The system of claim 14, wherein the first unique identifier includes a first IMEI associated with the first UE and a first eSIM number, and wherein the second unique identifier includes a second IMEI associated with the second UE and a second eSIM number.

* * * * *